United States Patent
Brodigan et al.

(10) Patent No.: US 6,526,582 B1
(45) Date of Patent: *Feb. 25, 2003

(54) METHOD AND SYSTEM FOR PROVISIONING A SINGLE PHYSICAL BROADBAND DROP TO ACCOMMODATE MULTIPLE SPECIFIC DEVICES

(75) Inventors: Donald L. Brodigan, Westminster, CO (US); Gerald F. Baker, Littleton, CO (US); Patricia A. Dodson, Lake Oswego, OR (US)

(73) Assignee: Qwest Communications International Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/115,752

(22) Filed: Jul. 15, 1998

(51) Int. Cl.[7] .............................................. H04N 7/173
(52) U.S. Cl. .............................. 725/87; 725/25; 725/91; 725/114; 725/117; 725/98; 709/230; 709/231; 713/200
(58) Field of Search ........................ 725/25, 34, 86–87, 725/91, 93, 98–99, 107, 114, 116–117, 119; 370/486, 401; 709/230–231, 228–229, 249–250; 713/200–201

(56) References Cited

U.S. PATENT DOCUMENTS 5,420,923 A * 5/1995 Beyers et al. ............... 348/468
5,756,280 A * 5/1998 Soora et al. ................. 725/116
6,055,560 A * 4/2000 Mills et al. .................. 345/719
6,219,355 B1 * 4/2001 Brodigan ................ 370/395.51
6,289,381 B1 * 9/2001 Brodigan ..................... 709/225

* cited by examiner

*Primary Examiner*—Andrew Faile
*Assistant Examiner*—Ngoc Vu
(74) *Attorney, Agent, or Firm*—Townsend and Townsend and Crew LLP

(57) ABSTRACT

A method and system for provisioning a specific device to receive video and/or data services from a plurality of service providers at a physical drop in a digital broadband network serviced by a telecommunication services provider utilizes a broadcast manager for transmitting an electronic message in a modified format determined by the telecommunication services provider, wherein the electronic message contains information identifying the physical drop associated with the specific device. A broadband digital terminal, in communication with the broadcast manager and the physical port, receives the electronic message, stores the information, and upon receiving a sign-on request from a requesting device that is requesting access to one of the video and/or data services, determines whether the requesting device is authorized to access the requested video and/or data service based on the stored information.

18 Claims, 3 Drawing Sheets

METHOD AND SYSTEM FOR PROVISIONING A SINGLE PHYSICAL BROADBAND DROP TO ACCOMMODATE MULTIPLE SPECIFIC DEVICES

CROSS-REFERENCE TO RELATED APPLICATIONS

This application is related to co-pending, commonly assigned U.S. patent application Ser. No. 09/115,749, entitled, "METHOD AND SYSTEM FOR PROVISIONING A SINGLE PHYSICAL BROADBAND DROP TO ACCOMMODATE MULTIPLE DEVICES," filed on Jul. 7, 1998 by Donald Brodigan, the entirety of which application is incorporated herein by reference for all purposes.

TECHNICAL FIELD

This invention relates to methods and systems for provisioning single physical broadband drops to accommodate multiple specific devices.

BACKGROUND ART

Existing cable TV networks utilize Hybrid Fiber Coaxial ("HFC") architecture that includes a fiber coaxial distribution network similar to a tree and branch architecture. All video channels are sent to this HFC network for distribution throughout the network. The cable TV service provider has a controller at the headend that is connected to the HFC network and another connection through a Business System Interface ("BSI") to a company that provides the platform for the service provider for provisioning the video service for the cable TV's customers.

Provisioning commands are sent from the platform company to the controller including a media access control ("MAC") address of the customer's set-top-box ("STB"), which is purchased or leased from the service provider, and the entitlements the customer has subscribed to. The controller then broadcasts this provisioning information over the HFC network to the STB having the MAC address specified in the provisioning command. The customer's STB must be attached to the network in order for it to receive the entitlements it has subscribed to. Thus, the STB can be anywhere on the network since it is not associated with a single physical drop corresponding to the customer's home/place of business. Furthermore, anyone capable of duplicating the MAC address of the customer's STB can receive free service.

Some cable TV operators have chosen to use interdiction devices on their HFC network which eliminates the need for the customer to have an STB. The interdiction devices, located at a pedestal serving several homes, are provisioned from a controller at the headend for entitlements based on a physical drop. Any cable-ready TV connected to the drop is capable of receiving and viewing the provisioned entitlements. All other channels are filtered or modified at the interdiction device so that they cannot be view on that physical drop.

Interdiction devices, however, have several drawbacks. First, they are designed for analog cable TV and do not support digital MPEG video. Second, interdiction devices are designed for a single cable TV network serving the customer. Thus, multiple video/data service providers are not supported. And third, all devices on the physical drop associated with the corresponding interdiction device receive all the unfiltered channels and entitlements. There is no ability to allow each device to have its own specific entitlements.

Today's digital broadband architecture allows for multiple service providers to serve a single customer belonging to a video/data network. However, as with the traditional cable TV network, video/data entitlements can be provisioned for a single device. That device can be located anywhere in the network, yet still be able to receive the provisioned entitlements thereby opening the door for theft of services, especially if the MAC address of the device can be duplicated by an unauthorized customer.

Thus, there exists a need for a method of provisioning a physical drop to allow a customer to obtain access to video/data services based on the customer's address in a digital broadband architecture that overcomes the disadvantages encountered by the known prior art.

DISCLOSURE OF THE INVENTION

It is therefore a general object of the present invention to provide a method and system for provisioning a single physical drop in a digital broadband architecture that allows a customer to obtain access to video/data services based on the customer's address.

It is another object of the present invention to provide a method and system for provisioning a single physical drop to be able to obtain access to various video and data suppliers based on the customer's address.

It is yet another object of the present invention to provide a method and system for provisioning a single physical drop so as to allow each device on the physical drop to be provisioned with different or same type of entitlements for each device.

In carrying out the above objects and other objects, features, and advantages of the present invention, a method is provided for provisioning a first specific device to receive video and/or data services from a plurality of service providers at a customer's physical drop in a digital broadband network serviced by a telecommunication services provider wherein the plurality of service providers normally communicate with the telecommunication services provider utilizing electronic messages having predetermined formats as defined in a communications protocol. The method includes transmitting an electronic message in a modified format determined by the telecommunication services provider and containing information identifying the physical drop associated with the first specific device, storing the information at a location servicing the physical drop, and upon receiving a sign-on request from a requesting device that is requesting access to one of the video and data services, determining whether the requesting device is authorized to access the requested video or data service based on the stored information.

In further carrying out the above objects and other objects, features, and advantages of the present invention, a system is also provided for carrying out the steps of the above described method. The system includes a broadcast manager, in communication with the video/data service providers, for transmitting an electronic message in a modified format determined by the telecommunication services provider, the electronic message containing information identifying the physical drop associated with the first specific device. The system also includes a broadband digital terminal, in communication with the broadcast manager and the physical port, programmed to receive the electronic message, store the information, and upon receiving a sign-on request from a requesting device that is requesting access to one of the video and/or data services, determine whether the requesting device is authorized to access the requested video and/or data service based on the stored information.

The above objects and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
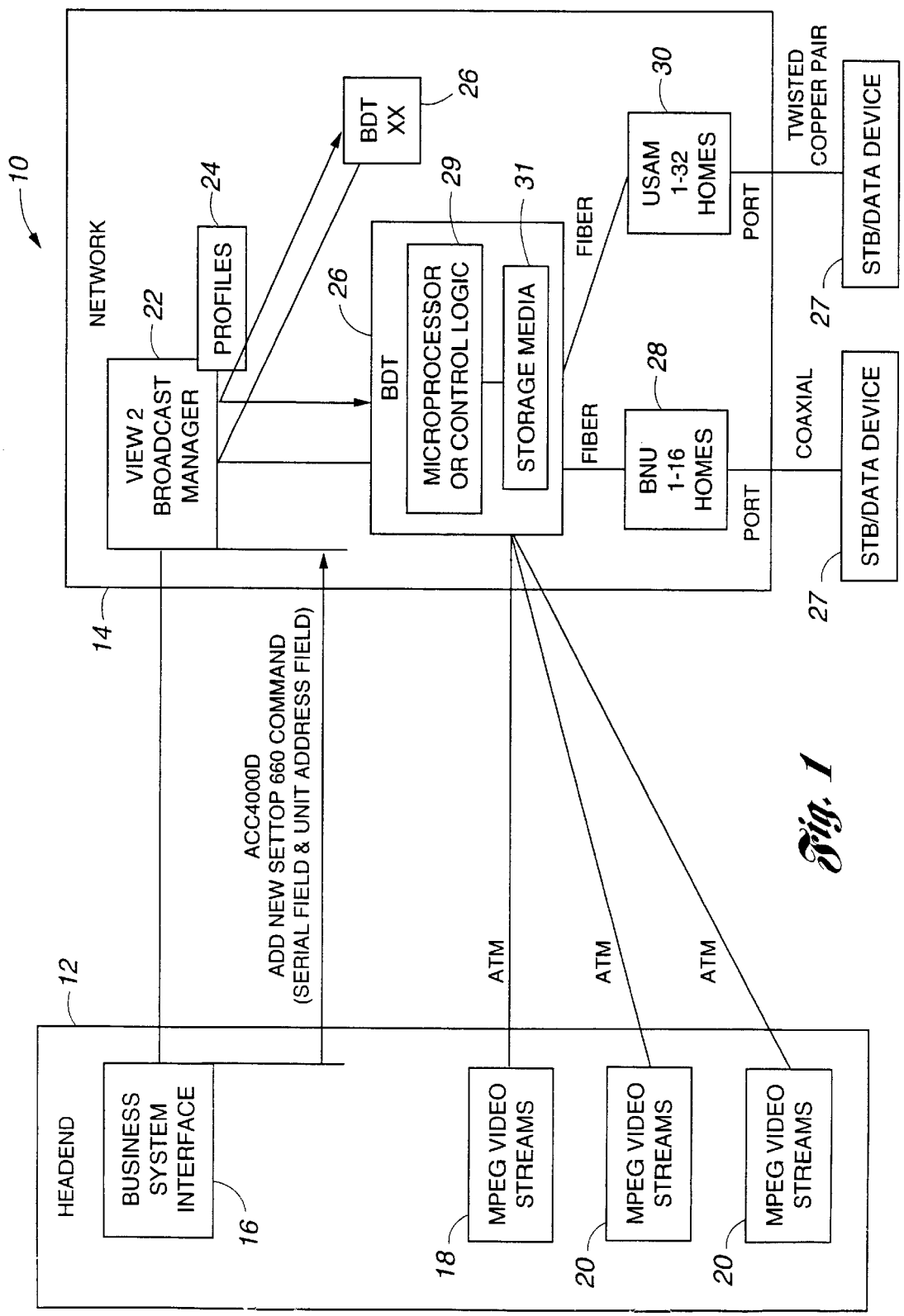
FIG. 1 is a block diagram of the system of the present invention.

FIG. 1 is a block diagram illustrating the system of the present invention, denoted generally by reference numeral 10. The system 10 includes a headend portion 12 and a network portion 14. The headend 12 includes a Business System Interface ("BSI") 16 for interconnecting the network 14 with a platform company serving a service provider. The BSI 16 sends provisioning commands to the network 14 utilizing a predetermined format/protocol.

The headend 12 further includes video service providers 18 that provide motion video/audio data encoded according to MPEG 1 and 2 video encoding standards. Examples of video service providers 18 include satellite MPEG 2 video delivery (DSS Satellite and Primestar) as well as other cable companies moving towards digital cable TV technology.

Data service providers 20 are also included in the headend 12 for providing data services. Data service providers may include service providers such as America On-Line, Prodigy, Microsoft Network, MCI, and other internet and intranet data service providers as well as corporate data service providers.

The network 14 includes a View 2 Broadcast Manager 22 in communication with the BSI 16 for receiving the provisioning commands and managing video and high speed data access at a customer's physical drop. Upon receiving a provisioning command from the BSI 16, the broadcast manager 22 creates a customer profile 24 that identifies the video channel entitlements that are associated with a specific physical drop serving a residence or business. In the case of data services, the profile 24 is used to identify the data service provider 20. Asynchronous Transfer Mode (ATM) is used between the customer and the data service provider 20 so as to provide a private line-like connection.

Video/data entitlements are then provisioned through the broadcast manager 22 to a Broadband Digital Terminal ("BDT") 26 serving the customer. The network 14 preferably includes a plurality of BDTs 26, each of which serve a plurality of customers. The number of customers served is dependent upon the actual vendor's equipment. The BDT 26 is coupled to the video and data service providers 18 and 20 so that multiple video and data service providers can be served on a shared transport. Data is established from the customer's physical drop through the BDT 26 to a data network and then to the appropriate data service provider 20. In the case of video, the video service provider 18 sends MPEG video through the data network to the BDT 26. The customer selects a channel from their STB 27 to the BDT 26 to select the video channel they want to watch, but is restricted to the channel entitlements provisioned in their profile 24. Thus, the BDT 26 is responsible for switching the video and data provided by the video and data service providers 18, 20 to the appropriate physical drop based on the provisioned profile 24 transferred from the broadcast manager 22.

Each of the BDTs 26 includes a microprocessor 29 in communication with various computer readable storage media 31. Computer-readable storage media 31 may include various types of media or memories and may be implemented utilizing any of a number of known hardware devices such as flash memory, PROMs, EEPROMs, and other electrical, electromagnetic, and optical storage devices capable of storing data representing instructions executable by a computer. As is known, computer-readable media 31 contain various program instructions, software, or control logic to affect access to the service providers 18, 20. Microprocessor 29 executes various instructions to generate out-put signals to each of the service providers 18, 20 based on signals received from the devices 27 via a Broadband Network Unit ("BNU") 28 or a Universal Service Access Multiplexer ("USAM") 30, as described below.

Each of the BDTs 26 are coupled to either a BNU 28 or a USAM 30. The BNU 28 is a physical unit that is placed in the serving neighborhood and is connected to the BDT 26 via a single fiber link. Typically, the BNU 28 serves up to 16 homes or physical drops. A coaxial cable is run from a port (#1–16) on the BNU 28 to the home or business so that multiple devices on a single physical drop can have different entitlements. A twisted copper pair running between the BNU 28 and a home or business provides telephone service.

The USAM 30 performs the same function as the BNU 28, but combines the video and data service on the same twisted copper pair as the voice, or telephone, service. By providing video/data and voice on a single pair of wires to the customer, the total customers served is increased from 16 to 32.

Figure 2:
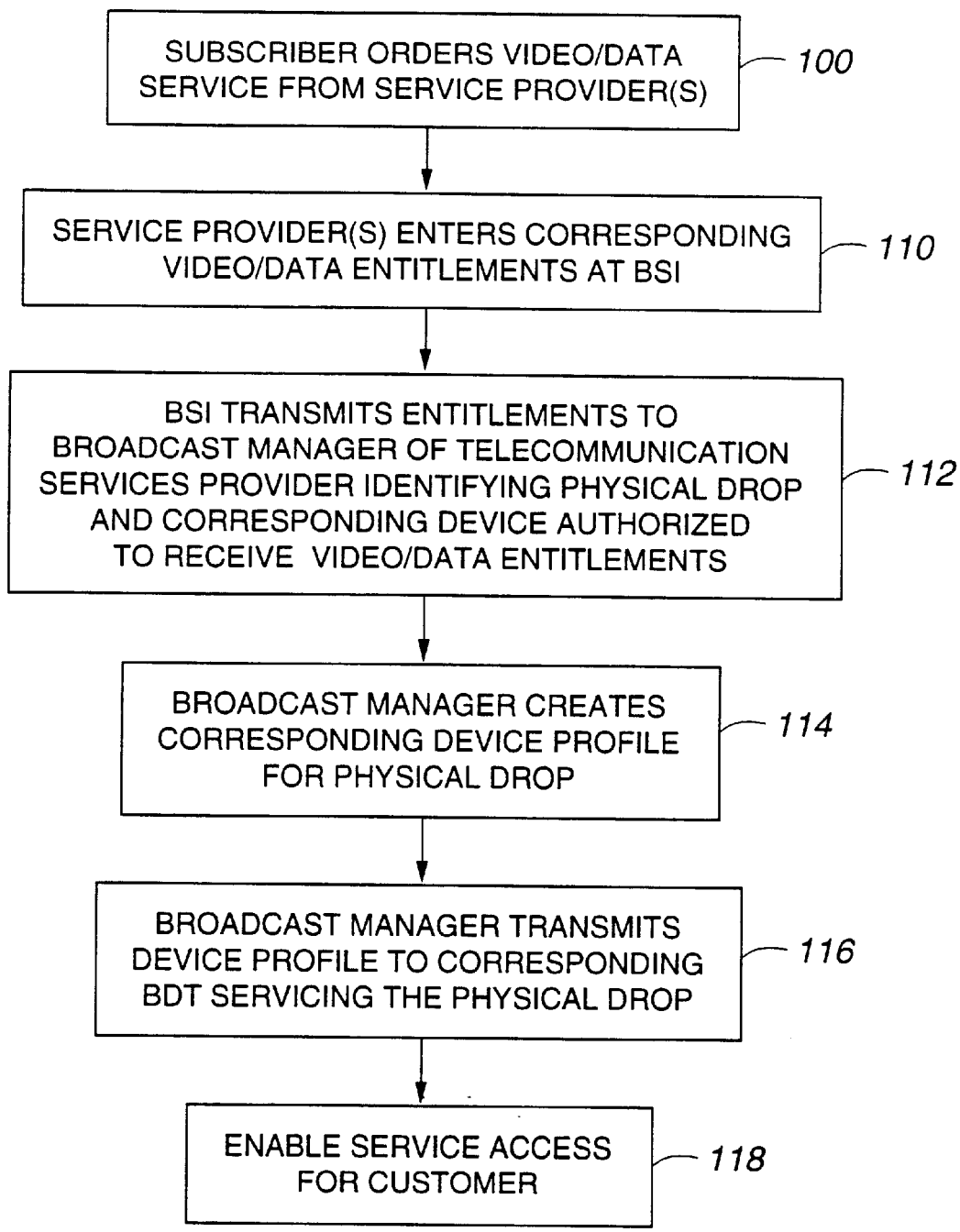
FIG. 2 is a flow diagram illustrating the general sequence of steps associated with the provisioning process of the present invention.

Turning now to FIG. 2, there is shown a flow diagram illustrating the general sequence of steps associated with the provisioning process of the present invention. First, the customer orders video and/or data service from one of many video/data service providers servicing the customer's area, as shown at block 100. At this time, the customer provides the video/data service provider(s) with one or more devices, or STBs, for which she would like provisioned. Each device has a specific MAC address so that each device can be separately identified.

The video or data service provider then enters the video/data entitlements in the BSI 16, as shown at block 110. At block 112, the BSI 16 then transmits the entitlements to the broadcast manager 22 identifying the physical drop to be provisioned. This information is preferably transmitted utilizing the existing Jerrold communication protocol, specifically the Add New Settop 660 command. The Add New Settop 660 command is utilized to add a new digital settop box and authorize services for the settop box. This command contains the following fields in addition to the STX, the packet header, the Checksum field, and the ETX:

| Field | Format |
|---|---|
| BSI_Code | 16-bit unsigned integer |
| Headend_Number | 16-bit unsigned integer |
| Equip_Type | 16-bit unsigned integer |

-continued

| Field | Format |
| --- | --- |
| Equip_Sub_Type | 16-bit unsigned integer |
| Serial_Number | 12-character alphanumeric |
| Unit_Address | 16-character alphanumeric |
| Init_Flag | 8-bit unsigned integer |
| Num_Changed_Services | 16-bit unsigned integer |
| Service_Handle | 32-bit unsigned integer |

The BSI_Code and Headend_Number identify the video or data service provider. The Equip_Type and Equip_Sub_Type codes identify the specific manufacturer, model number, and software release of the STB or data device being provisioned. The Serial_Number field identifies the MAC address of the STB/data device. The Service_Handle field is used to specify the video or data entitlements the customer has subscribed to. The Unit_Address field specifies the unit address assigned to the STB/data device by the manufacturer. Although these fields specify entitlements provisioned for a specific STB/data device, none of them, alone or together, provide information so as to insure that the STB/data device is at the authorized physical drop and, if applicable, one of many devices authorized on the physical drop.

Therefore, in the present invention, the Unit_Address field is modified to identify the customer's address, while the actual entitlements remain controlled by the code in the Service_Handle field. The Unit_Address is modified as follows:

XX XXXX XXXXXX XXX XX where,
  the first 2 Octet=State code identifying the state in which the service is being provided;
  the next 4 Octet=Common Language Circuit Identifier ("CLCI") identifying the serving wire center;
  the next 6 Octet=BDT/BNU/Port identifying the physical location of the customer's broadband drop;
  the next 3 Octet=Service Wire Center identifying the central office that provides dialtone to the physical drop; and
  the next 2 Octet=a fixed value, e.g., U, due to limited field length, but could be used for other features in the future.

Upon receiving the video/data entitlements, the broadcast manager creates a device profile for the customer's physical drop, as shown at block 114. The device profile includes service provider information, entitlements, device type (or equipment type), MAC address of video/data device, and physical drop identification information, i.e., BDT, BNU/USAM and Port.

A physical broadband drop can support multiple device profiles. Therefore, if the customer is provisioning more than one device, the BSI 16 transmits the additional entitlement information to the broadcast manager 22. In this case, all the information transmitted in the Unit_Address field remains the same except for the Serial_Number field and the Service_ Handle field. The Serial_Number field will contain the specific MAC address of the additional/different STB/data device, while the Service_Handle field will contain the entitlements subscribed to by the customer for that specific STB/data device.

The device profiles are then transmitted by the broadcast manager 22 to the appropriate BDT 26 identified in the Unit_Address field, as shown at block 116. The BDT 26 identified in the Unit_Address field corresponds to the BDT 26 serving the customer's home or place of business. Finally, access to the video/data service subscribed to by the customer is enabled, as shown at block 118.

Figure 3:
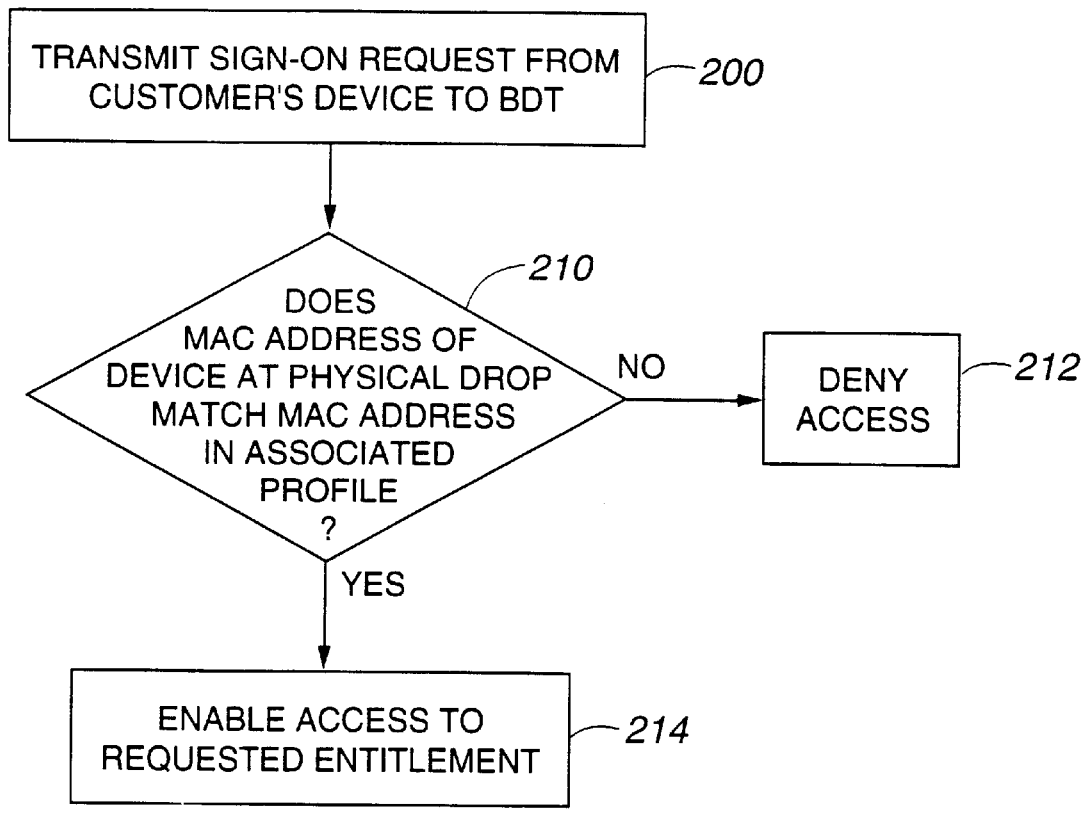
FIG. 3 is a flow diagram illustrating the general sequence of steps associated with the sign-on process of the present invention.

Thus, the BDT 26 stores the device profile(s) associated with a single physical drop for use in allowing the customer to gain access to the subscribed services. This process is further illustrated in the flow diagram of FIG. 3. The device 27 uses the DAVIC 1.2 Interface Initialization Protocol (DiiP) to register with the network 14. Upon activating the device 27, the device transmits a sign-on request, including the MAC address of the device 27, to the BDT 26, as shown at block 200.

When the BDT 26 receives the sign-on request from the device 27, the BDT 26 looks in a table for a device profile associated with the physical drop from which the sign-on request originated to determine if the MAC address sent by the requesting device matches a MAC address stored in the device profile, as shown at block 210. If the MAC address does not match a preprovisioned MAC address profile, the BDT 26 denies access to the device 27, as shown at block 212. However, if there is a match, the device 27 is given access to the requested services, as shown at block 214.

While the best modes for carrying out the invention have been described in detail, those familiar with the art to which this invention relates will recognize various alternative designs and embodiments for practicing the invention as defined by the following claims.

What is claimed is:

1. In a digital broadband network serviced by a telecommunication services provider, a method for allowing a first specific device at a physical drop to receive access to video and/or data services from a plurality of video/data service providers, wherein the video/data service providers normally communicate with the telecommunication services provider utilizing electronic messages having predetermined formats as defined in a communications protocol, the method comprising:
  transmitting an electronic message in a modified format determined by the telecommunication services provider, the electronic message containing information identifying the physical drop associated with the first specific device;
  storing the information at a location servicing the physical drop; and
  upon receiving a sign-on request from a requesting device that is requesting access to one of the video and data services, determining whether the requesting device is authorized to access the requested video or data service based on the stored information.

2. The method as recited in claim 1 wherein the communications protocol is a Jerrold protocol having an Add New Settop Command defined in a first format and wherein transmitting the electronic message comprises transmitting the Add New Settop Command having the modified format.

3. The method as recited in claim 2 wherein the Add New Settop Command includes a Unit_Address field normally identifying a unit address of the first device and wherein transmitting the Add New Settop Command having the modified format comprises transmitting the Unit_Address field identifying the physical port associated with the physical drop.

4. The method as recited in 1 wherein transmitting the electronic message includes transmitting a second electronic message in the modified format containing information identifying a second specific device associated with the physical drop, the second specific device authorized to receive same or different video/data services as the first specific device.

5. The method as recited in claim 1 wherein storing the information includes storing an address of the first specific device along with the corresponding physical port of the physical drop.

6. The method as recited in claim 5 wherein determining whether the requesting device is authorized to access the requested video and/or data service comprises:
   determining an address of the requesting device and the physical port originating the sign-on request; and
   comparing the address of the requesting device and the originating physical port with the address of the first specific device associated with the originating physical port.

7. A computer readable storage medium having data stored therein representing instructions executable by a computer to provision a first specific device to receive video and/or data services from a plurality of video/data service providers at a physical drop in a digital broadband network serviced by a telecommunication services provider, the video/data service providers normally communicating with the telecommunication services provider utilizing electronic messages having predetermined formats as defined in a communications protocol, the instructions comprising instructions for:
   receiving an electronic message in a modified format determined by the telecommunication services provider, the electronic message containing information identifying the physical drop associated with the first specific device;
   storing the information; and
   upon receiving a sign-on request from a requesting device that is requesting access to one of the video and data services, determining whether the requesting device is authorized to access the requested video and data service based on the stored information.

8. The computer readable storage medium of claim 7 wherein the communications protocol is a Jerrold protocol having an Add New Settop Command defined in a first format and further comprising instructions for causing the computer to receive the electronic message by:
   receiving the Add New Settop Command having the modified format.

9. The computer readable storage medium of claim 8 wherein the Add New Settop Command includes a Unit_Address field normally identifying a unit address of the first device and further comprising instructions for receiving the Add New Settop Command having the modified format by:
   receiving the Unit_Address field identifying the physical port associated with the physical drop.

10. The computer readable storage medium of claim 7 further comprising instructions for:
    receiving a second electronic message in the modified format containing information identifying a second specific device associated with the physical drop, the second specific device authorized to receive same or different video/data services as the first specific device.

11. The computer readable storage medium of claim 7 further comprising instructions for causing the computer to store the information by:
    storing an address of the first specific device along with the corresponding physical port of the physical drop.

12. The computer readable storage medium of claim 11 further comprising instructions for causing the computer to determine whether the requesting device is authorized to access the requested video and/or data service by:
    determining an address of the requesting device and the physical port originating the sign-on request; and
    comparing the address of the requesting device and the originating physical port with the address of the first specific device associated with the originating physical port.

13. A system for provisioning a first specific device to receive video and/or data services from a plurality of video/data service providers at a physical drop in a digital broadband network serviced by a telecommunication services provider, the video/data service providers normally communicating with the telecommunication services provider utilizing electronic messages having predetermined formats as defined in a communications protocol, the system comprising:
    a broadcast manager, in communication with the video and data services providers, for transmitting an electronic message in a modified format determined by the telecommunication services provider, the electronic message containing information identifying the physical drop associated with the first specific device; and
    a broadband digital terminal, in communication with the broadcast manager and the physical port, programmed to receive the electronic message, store the information, and upon receiving a sign-on request from a requesting device that is requesting access to one of the video and data services, determine whether the requesting device is authorized to access the requested video or data service based on the stored information.

14. The system as recited in claim 13 wherein the communications protocol is a Jerrold protocol having an Add New Settop Command defined in a first format and wherein the broadcast manager, in transmitting the electronic message, is further operative to transmit the Add New Settop Command having the modified format.

15. The system as recited in claim 14 wherein the Add New Settop Command includes a Unit_Address field normally identifying a unit address of the first device and wherein the broadcast manager, in transmitting the Add New Settop Command having the modified format, is further operative to transmit the Unit_Address field identifying the physical port associated with the physical drop.

16. The system as recited in claim 13 wherein the broadcast manager, in transmitting the electronic message, is further operative to transmit a second electronic message in the modified format containing information identifying a second specific device associated with the physical drop, the second specific device authorized to receive same or different video/data services as the first specific device.

17. The system as recited in claim 13 wherein the broadband digital terminal, in storing the information, is further operative to store an address of the first specific device along with the corresponding physical port of the physical drop.

18. The system as recited in claim 17 wherein the broadband digital terminal, in determining whether the requesting device is authorized to access the requested video and/or data service, is further operative to determine an address of the requesting device and the physical port originating the sign-on request, and compare the address of the requesting device and the originating physical port with the address of the first specific device associated with the originating physical port.

* * * * *